United States Patent
Deenadhayalan et al.

(10) Patent No.: US 6,192,481 B1
(45) Date of Patent: Feb. 20, 2001

(54) STRUCTURE AND METHOD FOR POWER SEQUENCING OF DISK DRIVES IN A COMPUTER SYSTEM

(75) Inventors: Veera Deenadhayalan; Parthiban Munusamy, both of Fremont, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/136,644

(22) Filed: Aug. 18, 1998

(51) Int. Cl.$^7$ ............................................. G06C 1/32
(52) U.S. Cl. ............................................. 713/324; 711/114
(58) Field of Search .................... 713/300–340; 711/114

(56) References Cited

U.S. PATENT DOCUMENTS 5,297,067 * 3/1994 Blackborow et al. ............ 710/129
5,535,400 * 7/1996 Belmont .......................... 713/330
5,586,271 * 12/1996 Parrett ............................ 710/103
5,761,705 * 6/1998 DeKoning et al. .............. 711/113

* cited by examiner

*Primary Examiner*—David A. Wiley
(74) *Attorney, Agent, or Firm*—Flehr Hohbach Test Albritton & Herbert LLP

(57) ABSTRACT

A method and device for detecting and handling non-responsive devices in a computer system where the device non-responsiveness may be due to a powered-down status rather than a device failure, and more particularly to such computer systems when the devices are RAID disk drives. By scanning all devices connected in a configuration and maintaining a count of devices that time out without responding, a determination can be made as to whether the devices are powered off or are experiencing some other problem that requires attention of a system support technician.

5 Claims, 5 Drawing Sheets

STRUCTURE AND METHOD FOR POWER SEQUENCING OF DISK DRIVES IN A COMPUTER SYSTEM

FIELD OF THE INVENTION

This invention relates generally to apparatus and method for handling a non-responsive device in a computer system where the device non-responsiveness may be due to a powered-down status and not a device failure, and more particularly to such computer systems when the devices are RAID disk drives.

BACKGROUND OF THE INVENTION

Conventionally, for a computer system having a host processor powered by one switchable power supply, and one or more peripheral devices powered by a second alto switchable power supply, the order in which each of the host and peripheral device is powered on may affect the start or boot up procedure. More particularly, if the host is powered on before the peripheral devices, such peripheral devices may either not show up in the configuration, or show up but be identified as non-responding or the like inactive state.

This situation is particularly an issue in host computer systems which serve as database or information servers, and which typically have a host computer and one or more racks or shelves of rotating disk drive storage devices for storing the information. Customarily, each of the host computer processor rack and disc drive racks are powered by separate switchable power supplies. Unfortunately, the order and timing of the power up and power-down of the several racks effects the start-up or boot routine at system initialization, and may cause an error condition on shut-down or power-off.

These conditions have been tolerated in the past by (I) indoctrinating personnel as to the proper power-up and power-down sequence for the host computer and attached devices, (ii) by providing a master power-on switch for all of the equipment, or (iii) by correcting corrupted or erroneous device or system configuration files after the problem has occurred. Unfortunately, neither of the first two options has been entirely successful so that corruption still occurs, and when such corruption occurs, correction typically requires the intervention of a skilled computer administrator.

The problem is particularly acute relative to RAID disc drives on a server being marked logically off-line, some times referred to as simply off-line or "Dead".

SUMMARY OF THE INVENTION

This invention provides structure and method for handling a non-responsive device in a computer system where the device non-responsiveness may be due to a powered-down status rather than a device failure, and more particularly to such computer systems when the devices are RAID disk drives. By scanning devices connected to the computer system over a bus, a count can be made of the devices that do not respond after being signaled during a time interval. If after all scans to all connected devices has been made, if the count number equals the number of devices in the configuration, it is likely that a power down situation has occurred. In this case, the affected devices are indicated as unavailable rather than offline. If the count number does not equal the number of devices in the configuration, it is likely that some devices have failed or are experiencing problems. In this case, the affected devices are indicated to be "offline" rather than "unavailable." In the event that the devices are determined to be unavailable, the method of the present invention may be repeated as necessary to detect the connected devices once a power up has been performed.

DETAILED DESCRIPTION OF EMBODIMENTS OF THE INVENTION

Figure 1:
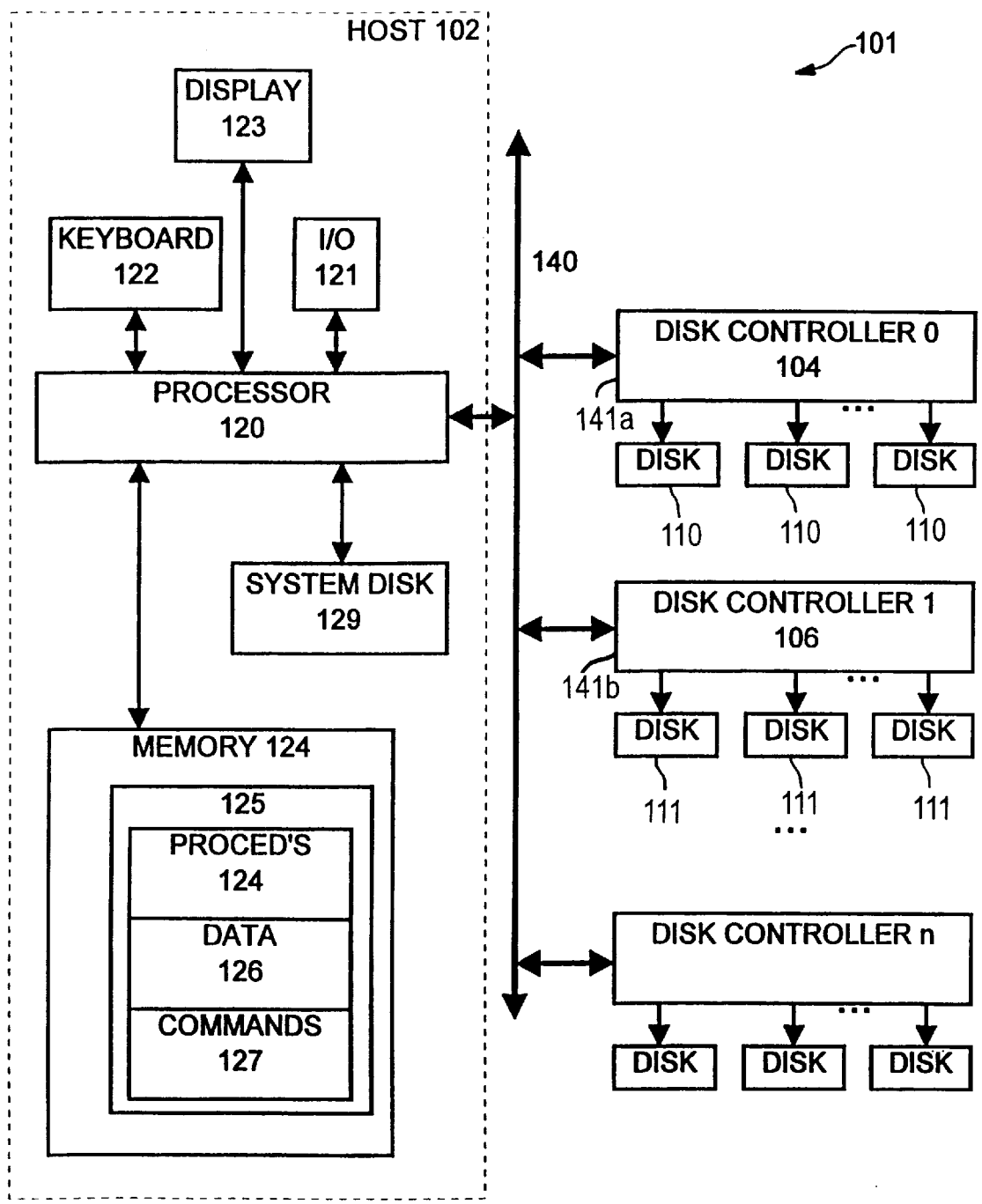
FIG. 1 is a diagrammatic illustration showing one embodiment of the inventive Structure and Method for Power Sequencing of Disk Drives in a Computer System.

We now describe embodiments of the invention relative to the computer system illustrated in FIG. 1. An exemplary embodiment of the inventive computer system 101 including a host computer 102, disk array controllers 104, 106, and arrays of disk drives 110,111, each array including one or more individual disk drives is illustrated in FIG. 1. Host computer 102 includes a processor 120, input/output devices 121, such as a keyboard 122, display device 123, memory 124 coupled to the processor and having a defined data structure 125 for storing data 126, commands 127, and procedures 128; and a system disk drive 129. Other conventional computer system components may also be provided. The controller is coupled to the processor by a PCI Bus 140, and the disk drives are coupled to the controller by SCSI cables 141, in conventional manner. While we primarily refer to disk drives or hard disk drives in this description, it should be understood that the invention is applicable to many types of storage media, including but not limited to rotating magnetic disk drives, magneto-optical devices, readable/writable CD's, fixed or removable media, floppy disk drives, and even electronic or solid state storage media.

Figure 2:
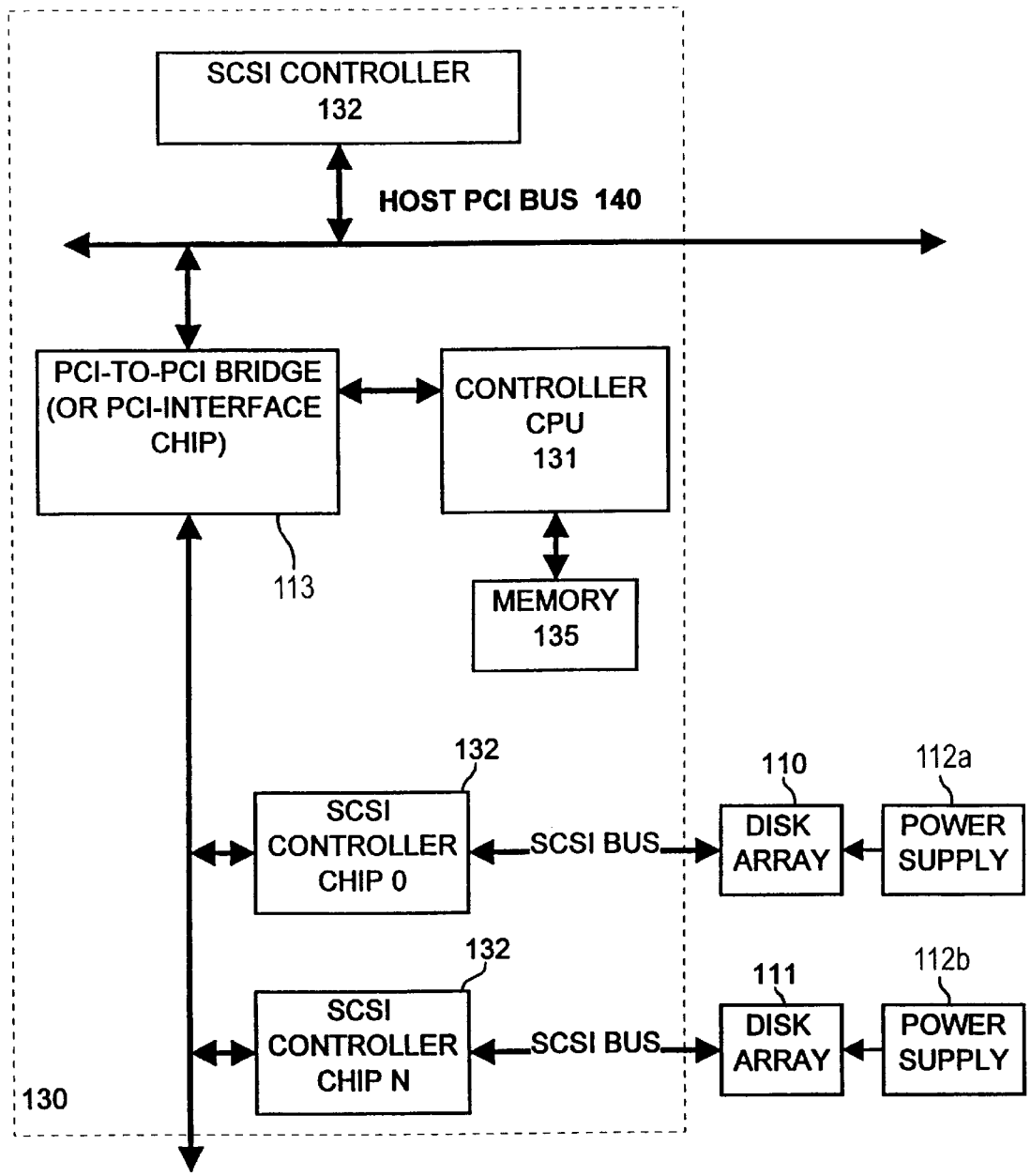
FIG. 2 is a diagrammatic illustration of a disk array controller.

In FIG. 2, there is illustrated a functional block diagram of an exemplary disk controller 130. Disk controller 130 is disposed within an enclosure in system and is typically fabricated as a single printed circuit board. Disk controller 130 includes controller CPU 131, one or more disk device/array controller 132 (for example SCSI, Fibre Channel, or IDE type controller), PCI bus (or other standard or proprietary bus) 133, PCI-to-PCI Bridge or PCI- interface chip 134 (depending on configuration), and storage means 135 such as a DRAM, SDRAM, EDO, or the like memory. SCSI Chip control/interrupt lines also connect the controller CPU with each of the SCSI Controller Chips 0, . . . , N. In the embodiment illustrated in FIG. 2, the controller draws power form the host PCI Bus 140.

Those workers having ordinary skill in the art will appreciate that although a specific host system, controller architecture, disk storage devices, and system interconnect are illustrated, that the inventive structure and method are not limited to these particular implementations. Furthermore, unless necessary for understanding the invention, standard computer system components and data or control lines are not shown or described so as not to obscure the invention. For example, although PCI busses and SCI busses are described, other communication means such as Fiber Channel, IDE, or other proprietary communication busses or links may be employed.

The controller comprises a CPU 131 and memory component(s) 135 to provide for execution of the inventive method. The controller comprises one or more printed circuit boards connected on a proprietary bus (Mylex Corporation of Fremont, Calif.). The disk arrays 110, 111 are connected to the bus specific controller chips 132 SCSI/Fibre and these controllers chips 132 may be present on the same printed circuit board 130 or they may be present on the host PCI bus, depending on the desired implementation.

The controller CPU 131 will execute and store its operating variables on the memory component 135. All the interrupt and other control lines for the controller chip 132 will be routed to the CPU 131 based on the type of bus to which they are connected.

The disk drive arrays 110, 111 each include a plurality of disk drives, but the controller may be configured to control only a single disk drive. More or fewer disk controllers may be provided in the inventive system, for example, a single controller may be configured, or 2, 3, 4, 5, or more may be configured, limited only by the number of PCI slots available in the host machine. Each array of disk drives is disposed in a cabinet or other enclosure up to a maximum addressable number of units (15 addressable units in the case of conventional SCSI) as is commonly done for Redundant Array of Independent Disk (RAID) storage configurations.

We now describe the basic operation of the RAID controller with respect to FIG. 2 which shows a diagrammatic illustration of an embodiment of the inventive structure showing selected functional blocks and/or devices and the bus structure which supports communication between the blocks or devices. The disk arrays with one or more disks are connected to the SCSI controller chip, hence forth referred to as the SCSI channel The cabinets enclosure management may be controlled by additional cables or they may use the reserved and generally unused SCSI lines (storage works) or the enclosure management functions may be controlled by a standard SAF-TE compliant CPU acting as a SCSI target.

The power supply failure line is pulled high by the controller internally. Whereas in the disk cabinet they are also pulled high (with a pull-up resistor). Whenever the cabinet is powered OFF but the controller is powered ON, the power supply failure line is pulled low. (This is true because the cabinet ground (GND) line and controller ground (GND) lines are interconnected.) The SAF-TE CPU is polled periodically, for example at 10 second intervals. If the cabinet is powered down, the SAFTE CPU will not respond.

We note that several commercial fault management devices and procedures are available the permit a Redundant Array of Independent Disks (RAID) controller to detect hard disk drive status changes. These commercial products include "SAFTE", "AEMI", and "Storage Works" (made by Digital Equipment Corporation of Maynard, Mass.). Possible RAID disk drive status include: on-line state, wherein the disk drive is ready for operation, standby state wherein the disk drive can act as a replacement when a drive becomes off-line, write-only state, wherein the disk drive is being rebuilt; and off-line state, wherein the disk drive is logically removed from operation.

Although these fault management systems have benefits, if by accident the hard drives were turned off prior to turning off the host computer, the fault management routine provided, such as the AEMI, SAFTE, or Storage Works routines, in the RAID controller will detect a disk drive removal and hence mark the hard drives as off-line (and therefore unusable). When a disk drive is marked "off-line" it is unusable. In order to make the disk drive that was marked off-line usable again, the administrator has to run a configuration utility to make the drives On-line; this requires expertise, time and hence costs money. In the event that the administrator is not available, individual users may not have the expertise or the security access to reset the drives; hence the drives and potentially the entire system are unusable or usable only with reduced capability.

The inventive structure and method solve this problem by detecting a disk drive power-off condition, so that the disk drive fault management system (if provided) does not mark the drive off-line, but rather takes other action to recover from the disk-drive power-off condition. Specifically, in one embodiment of the invention, if all the disk drives connected on a single SCSI channel fail to respond, this serves as an indication that all of the drives on the channel are powered-off, and none of the disk drives are marked off-line. Details of the inventive structure and method are described in greater detail below.

In the description that follows, we refer to a "storage shelf" which is one or more disks, and support for enclosure management if required. When the Storage Shelf is powered down prior to powering down the host, a disk drive to which an input/output (I/O) operation is attempted will fail to complete the I/O. The controller will get a drive selection timeout error condition. When such an error condition occurs, the RAID controller should scan the remaining devices on the SCSI channel to find out the number of devices responding. If more than one device was present in the channel and if none of those devices respond now, then the RAID controller should treat this error condition as a power fail case or situation, and reject all pending and future I/Os with a "drive not ready" error message. This error condition handling under the inventive method has the advantage that the disk drive is not marked "off-line" as in conventional systems, and the computer system (or remaining parts thereof can be powered off without any change in the RAID device configuration and without any need to recover the system upon power-up.

In a system configuration providing multiple SCSI channels, where the system disk drives are striped across the channels and/or Storage Shelves, all affected system drives are put into a "drive not ready" state if the cause is deemed to be a power failure. In level five (5) RAID systems, "affected system drives" include data drive and parity, in addition to the particular disk drive or storage shelve of drives that are actually powered down.

Figure 3:
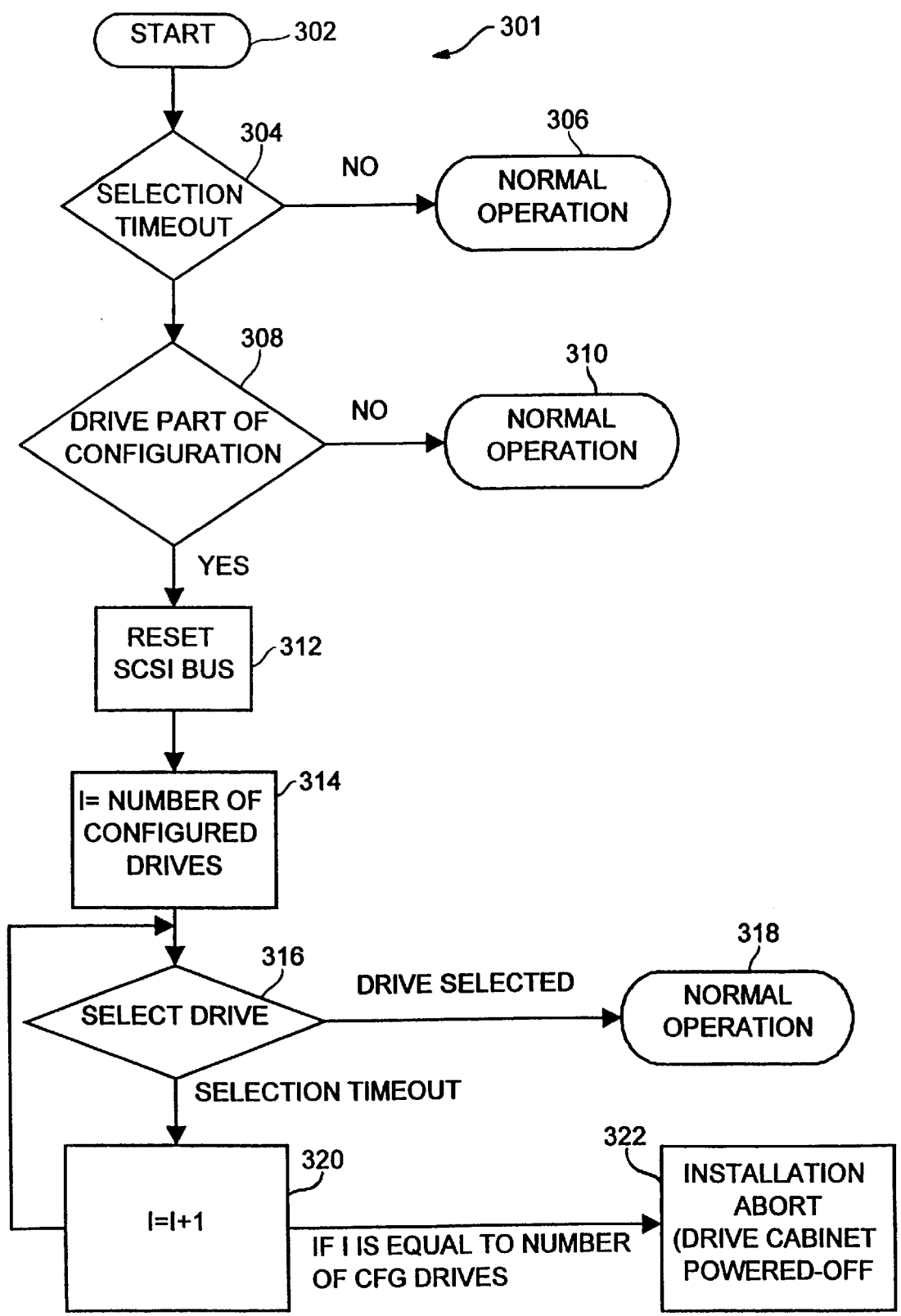
FIG. 3 is a diagrammatic flow-chart illustration showing a power-down embodiment of the inventive method.

This power-down embodiment of the invention is further described relative to the flow-chart diagram in FIG. 3. This method applies when a drive cabinet is powered off and a new command is being attempted. If a drive is selected and does not respond within a predetermined time interval (Step 304), the selection process times out. If after selection there is no timeout (Step 304), then operation is normal (Step 306) and the method in FIG. 3 does not apply. If there is a selection timeout, but the drive is not part of the then current configuration (Step 308), again operation is normal (Step 310) and the method does not apply further. If on the other hand, there is a selection timeout (Step 304) and the selected disk that times out is part of the drive configuration (Step 308), then the SCSI bus is reset (Step 312). After the SCSI (or other bus type) is reset, a counter is initialized at a value equal to the number of configured disk drives (Step 314).

Each drive is selected in turn (Step 316) to see if it responds within the timeout period. If it responds to the selection, operation is normal (Step 318). However, it the drive selection times out, the counter is incremented (Step 320), and additional drives are selected (Step 316) and tested until the counter (I) is equal to the number of configured drives. If the counter reaches that value, then an installation abort occurs (Step 322) indicating that the drive cabinet must be powered off.

Figure 4:
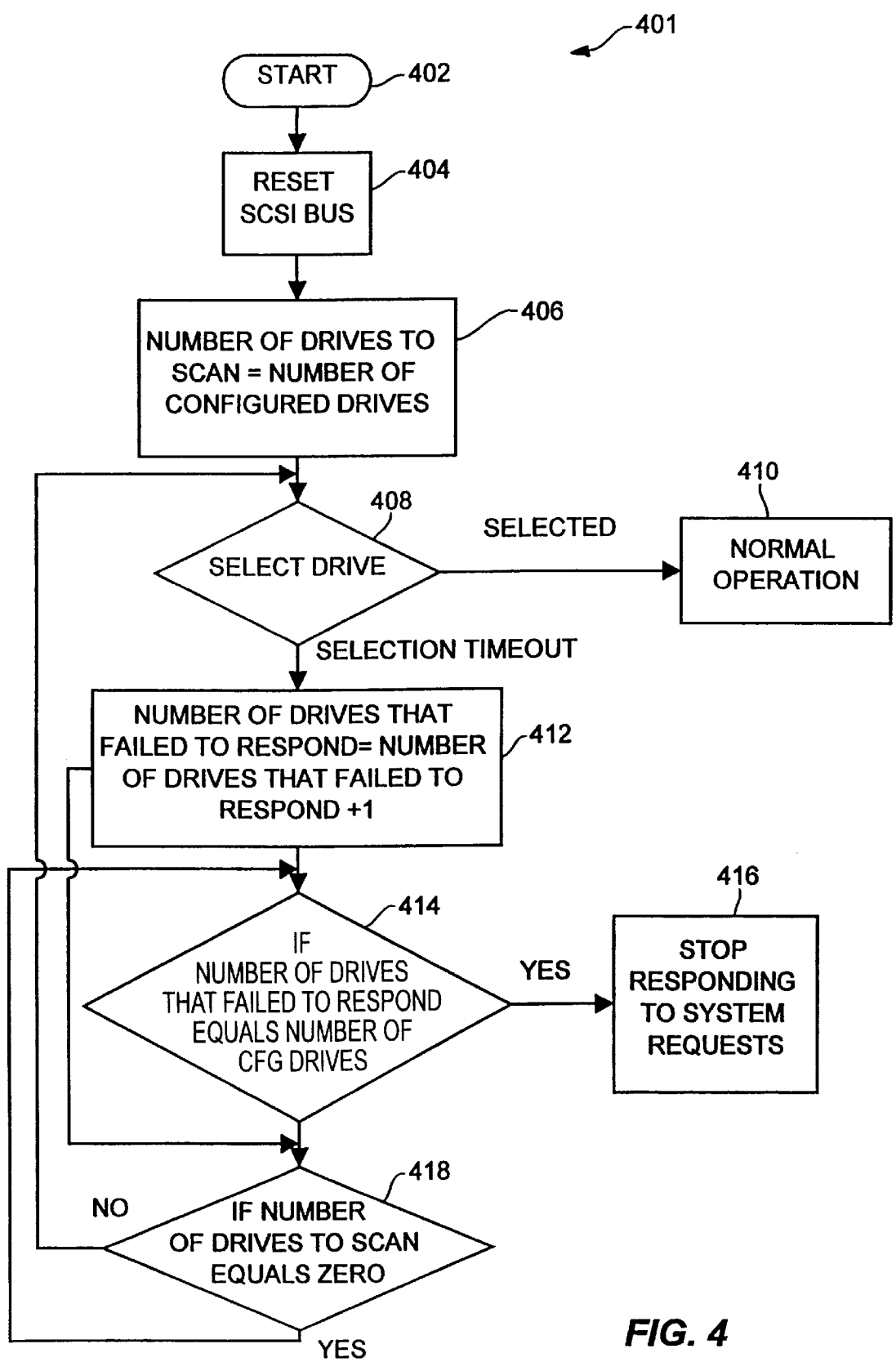
FIG. 4 is a diagrammatic illustration showing an embodiment a procedure for handling an error on a RAID controller during normal I/O operations.

We now describe an embodiment a method for handling an error on a RAID controller during normal I/O operations, for example, after accepting commands, the drive fails to respond to further commands within a specified period of time. One exemplary implementation of the method of the present invention is now described relative to the illustration of FIG. 4. Upon initialization, the SCSI bus is optionally reset (Step 404), then the number of drives scan is set to the number of configured drives (Step 406). Drives are then selected (Step 408) and if they respond to selection within a specified or predetermined period of time, operation is deemed normal (Step 410). In the event that the selected drive does not respond timely, there is a selection timeout condition. Next, the internal count is incremented by setting the number of drives that failed to respond to be equal to the number of drives that failed to respond plus one (Step 412). If the number of disk drives that failed to respond equals the number of configured disk drives (Step 414), then then stop responding to system requests (Step 416). However, if the number of disk drives that failed to respond does not equals the number of configured disk drives then a test is performed to determine if the number of drives to scan equals zero (Step 418). If the number of drives to scan equals zero, then Step 414 and any subsequent steps are repeated. If it is not equal to zero, then a new drive is selected and Steps 408, 412, 414, and 418 are repeated as necessary.

During normal disk I/O, if an error occurs, the RAID controller should perform the following steps. First, the controller scans the SCSI bus and determines those drives that are responding on the bus. Second, if at least one drive has responded during the bus scan, then proceed in conventional manner to place off-line (or "kill") those drives that are not responding. Since at least one disk drive on the commonly powered rack, unit, or storage shelf is operating and responsive, the entire unit cannot be powered off. Third, if only one drive was present prior to scanning then proceed in conventional manner to kill (mark as "off-line") that single drive that are not responding. In this instance, we may not know if the single disk drive is in some error state or is powered down, so we take a conservative approach and mark it off-line. Fourth, if the number of drives present prior to scanning is greater than one, and if all the drives on the common bus are not responding then all of these disc drives may be in a power-off or power-fail scenario. When these conditions are satisfied, an indicator flag is set to indicate the abnormal condition. Setting this flag prevents the host computer from accessing any drive in SCSI channel, by returning "drive not ready" error status. Whenever the abnormal condition flag is set no drives on the SCSI channel are killed or place off-line. Finally, once the user recycles or resets the power to the system, the abnormal condition flag is cleared by the firmware power-on reset initialization, and operation proceeds normally without further action. Since the drives were not killed, the RAID controller will follow the normal power up sequence and no corrective reconfiguration is required. It is noted that this procedure works equally well whether the aforementioned fault management routines (AEMI or Storage Works or SAFTE) are implemented or not.

We now describe a power-up sequence. During system power up, if the host computer is powered on before the disk drive box or rack is powered on, then the RAID controller will get a SCSI selection time-out on the disk drives in that box resulting in "installation abort" condition. Unless the user is aware that the proper power up sequence was not observed, it may be difficult to trouble shoot the reason for the installation abort, and some time will be involved in diagnosing the situation. Restarting or rebooting the host computer after the disk drive box is powered on will restore normal operation of the drives; however, the administrator or user must recognize the reason for the problem in order to take appropriate corrective action.

Under the inventive structure and method, any need to restart or reboot the computer with the disk drives powered on may be avoided by providing a RAID controller adapted to detect a disk drive power down situation and retry communication with the hard disk drives at some predetermined per channel interval, for example, 10 seconds, 20 seconds, 30 seconds, 1 minute, or the like. The retry interval may be adapted to the anticipated period of time between the various power-on steps, and may also include appropriate disk drive spin-up time if and where appropriate. This procedure is applicable for systems having a single storage shelf or for systems having multiple storage shelves and drives striped across the channels.

Figure 5:
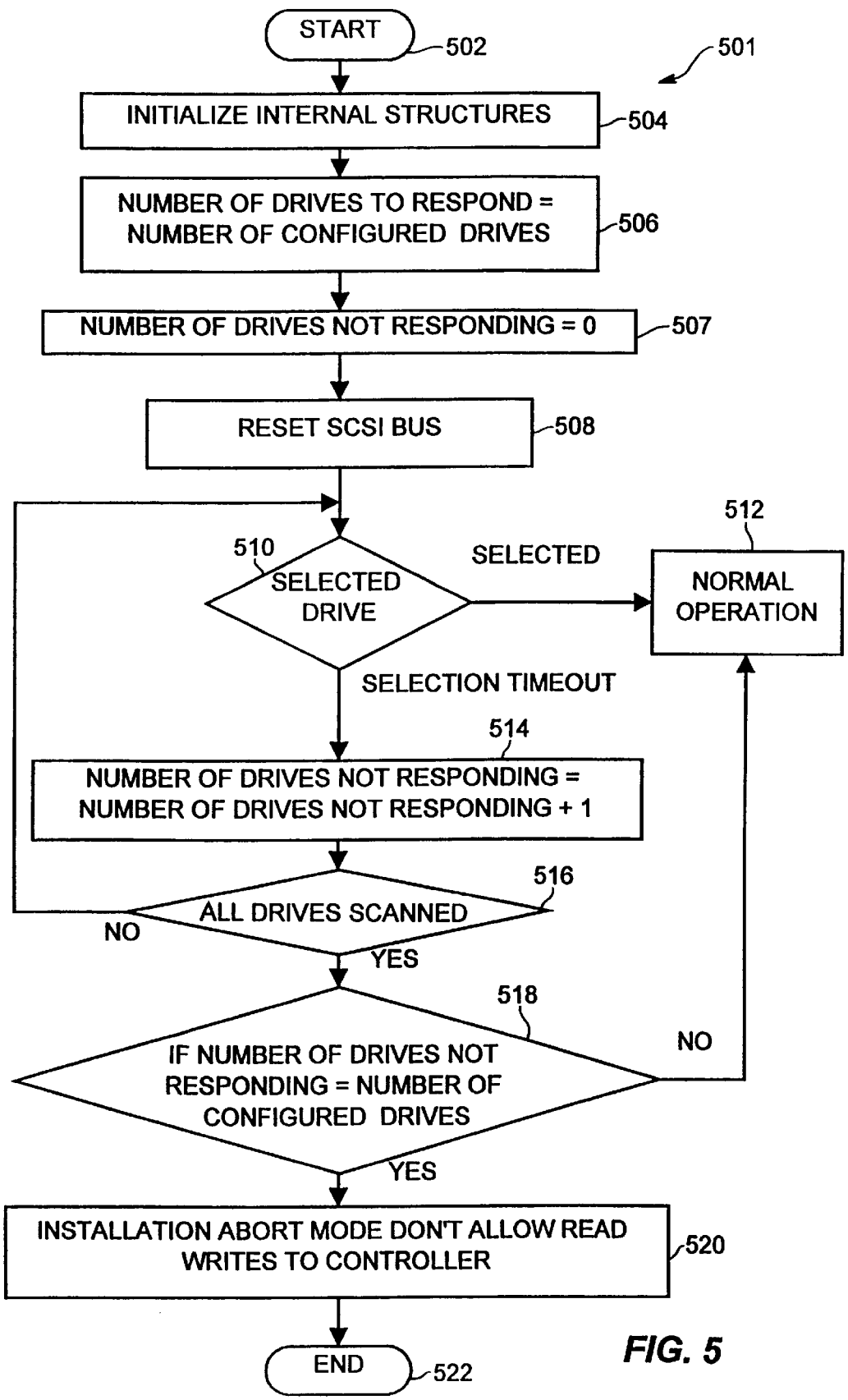
FIG. 5 is a diagrammatic flow-chart illustration showing an exemplary embodiment of the inventive power-up sequence which is implemented through changes in the disk drive initialization routine.

We now describe an exemplary embodiment of a controller power-up sequence which is implemented through changes in the disk drive initialization routine implemented as firmware. The procedure is described relative to the flow chart diagram of FIG. 5.

In this procedure, internal structures are first initialized (Step 504), then the number of drives to respond is set equal to the number of drives configured (Step 506). Next, the variable is initialized by setting the number of drives not responding to be equal to zero (Step 507). The SCSI bus (or other bus type) is then reset (Step 508) and a drive is selected (Step 510). IF the selected drives responds within a predetermined time period, operation is normal (Step 512), otherwise there is a select timeout condition detected. Next, the number of drives not responding is incremented by one (Step 514). The process is repeated (Step 516) until all drives have been scanned. If normal operation (Step 512) has not been detected by the time all drives have been scanned, then a further test is made to determine if the number of drives not responding equals the number of configured drives (Step 518). If they are equal, the installation is aborted and no further read write to the controller is permitted. If they are not equal, then normal operation occurs (Step 512).

During initialization, the firmware based procedure causes, for each SCSI channel, first a scan of the channel to identify all existing devices, that is all devices that are connected electronically. Second, if at least one disk drive device is configured for that channel, and none of the devices on that channel respond (possibly indicating that the disk drive box is not powered on), then retry the scanning operation one or more times at some interval of time (5, 10, or 20 seconds for example). In one embodiment of the invention, the scanning operation was retried three times, once every 10 seconds. If all the devices configured for that channel respond during the retry process, then proceed with normal operation as all of the devices that should be present in this channel appear to be operating normally. On the other hand, if not all of the devices configured for that channel respond during the initial or retry process, then inform the host computer about the non-responding devices so that they may be marked "off-line" and take other appropriate steps to recover from the installation abort mode.

If at least one disk drive device is configured for that channel, and at least one of the devices on that channel respond when performing the device scan, then mark the non-responding devices as "off-line" and proceed in conventional manner.

Note that although the RAID controller will inform the user about drives not responding as off-line or dead during system reboot, in the exemplary embodiment described here, the actual RAID configuration information in the controller for the drives will not be marked off-line. Thus, when the drive box is powered on subsequently and the CPU is rebooted, the drive box will become On-line and will therefore not require reconfiguration or other corrective action.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

We claim:

1. A method for handling a powered down situation in a computer system having at least one drive, the method comprising steps of:
   a) initializing the computer system at a value equal to the number of drives configured in the computer system;
   b) scanning, by the controller, each other drives to determine whether they respond within a timeout period;
   c) indicating, by the controller, that the drives are powered off if all the configured drives timed out; and,
   d) indicating that all drives that did not respond during the timeout period are unusable if the number of timed out drives is not equal to the number of configured drives.

2. A method for handling a powered down situation in a computer system having at least one drive, the method comprising steps of:
   a) initializing the computer system at a value equal to the number of drives configured in the computer system;
   b) scanning, by the controller, each other drives to determine whether they respond within a timeout period;
   c) indicating, by the controller, that the drives are powered off if all the configured drives timed out; and,
   d) operating normally if there is a selection timeout but the selected drive is not part of a current configuration.

3. A method for handling a powered down situation in a computer system having at least one drive, the method comprising steps of:
   a) initializing the computer system at a value equal to the number of drives configured in the computer system;
   b) scanning, by the controller, each other drives to determine whether they respond within a timeout period;
   c) indicating, by the controller, that the drives are powered off if all the configured drives timed out; and,
   d) indicating that intervention is required if the number of time outs does not indicate the number of configured drives.

4. The method of claim 3, wherein said intervention comprises user intervention.

5. A method for handling a powered down situation in a computer system having at least one drive, the method comprising steps of:
   a) initializing the computer system at a value equal to the number of drives configured in the computer system;
   b) scanning, by the controller, each other drives to determine whether they respond within a timeout period;
   c) indicating, by the controller, that the drives are powered off if all the configured drives timed out, wherein said timed out drives are put in a drive not ready state if the counter indicates the number of configured drives.

* * * * *